US008202152B2

(12) United States Patent
Walker et al.

(10) Patent No.: US 8,202,152 B2
(45) Date of Patent: Jun. 19, 2012

(54) SYSTEMS, METHODS, AND APPARATUS FOR FACILITATING MULTI-ROUND LOTTERY PLAY

(75) Inventors: Jay S. Walker, Ridgefield, CT (US); Zachary T. Smith, Norwalk, CT (US); Russell P. Sammon, San Francisco, CA (US); Stephen C. Tulley, Monroe, CT (US); Jeffrey Y. Hayashida, San Francisco, CA (US)

(73) Assignee: Walker Digital, LLC, Stamford, CT (US)

( * ) Notice: Subject to any disclaimer, the term of this patent is extended or adjusted under 35 U.S.C. 154(b) by 398 days.

(21) Appl. No.: 12/425,378

(22) Filed: Apr. 16, 2009

(65) Prior Publication Data

US 2009/0264176 A1 Oct. 22, 2009

Related U.S. Application Data

(60) Provisional application No. 61/045,358, filed on Apr. 16, 2008, provisional application No. 61/087,386, filed on Aug. 8, 2008, provisional application No. 61/045,854, filed on Apr. 17, 2008.

(51) Int. Cl.
*A63F 13/10* (2006.01)

(52) U.S. Cl. .......................................................... 463/17
(58) Field of Classification Search ............... 463/16–21
See application file for complete search history.

(56) References Cited

U.S. PATENT DOCUMENTS

| | | | | |
|---|---|---|---|---|
| 5,116,049 | A | 5/1992 | Sludikoff | |
| 5,129,652 | A * | 7/1992 | Wilkinson | 273/139 |
| 5,158,293 | A | 10/1992 | Mullins | |
| 5,232,221 | A | 8/1993 | Sludikoff | |
| 5,511,781 | A | 4/1996 | Wood et al. | |
| 5,772,511 | A | 6/1998 | Smeltzer | |
| 5,979,894 | A | 11/1999 | Alexoff | |
| 6,024,641 | A | 2/2000 | Sarno | |
| 6,220,961 | B1 | 4/2001 | Keane et al. | |
| 6,454,266 | B1 | 9/2002 | Breeding et al. | |
| 7,824,257 | B2 | 11/2010 | Jubinville et al. | |
| 2006/0172799 | A1 | 8/2006 | Kane et al. | |
| 2006/0287044 | A1 | 12/2006 | Duhamel | |

* cited by examiner

*Primary Examiner* — William D Coleman
*Assistant Examiner* — Daniel Shook
(74) *Attorney, Agent, or Firm* — Michael D. Downs; Fincham Downs, LLC

(57) ABSTRACT

Systems, methods and apparatus are provided for facilitating play of multi-round lottery games. In one embodiment, a player may be allowed to change one or more of various aspects of a wager in a multi-round lottery game.

19 Claims, 7 Drawing Sheets

400

| | GAME IDENTIFIER 402 | GAME RULES 406 | PAYOUT CRITERIA 1 408 | PAYOUT 1 410 | ... | PAYOUT CRITERIA N 412 | PAYOUT N 414 |
|---|---|---|---|---|---|---|---|
| R400-1 | GM-DRAW-001 | "MATCH AT LEAST 3 OF 6 DRAWN NUMBERS..." | 3/6 | $3 | ... | 6/6 | TOP PRIZE (TBD) |
| R400-2 | GM-DRAW-002 | "MATCH THE 3 DRAWN NUMBERS IN EXACT ORDER..." | 1/3 | $3 | ... | 3/3 | $500 |
| R400-3 | GM-DRAW-003 | "MATCH THE 4 DRAWN NUMBERS IN ANY ORDER..." | 2/4 | $5 | ... | 4/4 | $5000 |
| | ... | ... | ... | ... | | ... | ... |
| R400-(N-1) | GM-DRAW-N | "SELECT UP TO TEN NUMBERS FROM THE FIELD OF 1-80..." | 1 SPOT, 1 MATCH | $2 | ... | 10 SPOTS, 10 MATCHES | 100,000 |
| R400-N | GM-INSTANT-N | "SCRATCH-OFF THE PLAY AREA. MATCH ANY THREE SYMBOLS..." | N/A | $2 | ... | N/A | $1,000 |

FIG. 4

500

| | | | | | |
|---|---|---|---|---|---|
| | GAME IDENTIFIER: GM-DRAW-001 502 | | | | |
| | GAME INSTANCE IDENTIFIER: GM_D001_06/01/08_AND_06/03/08 504 | | | | |
| | EXPIRATION DATE: 06/01/09 506 | | | | |
| | TICKET / ENTRY IDENTIFIER 508 | TICKET / ENTRY INDICIA 1 510 | TICKET / ENTRY INDICIA 2 512 | | TICKET / ENTRY INDICIA N 514 |
| R500-1 | T-111111 | 03 | 11 | ... | 39 |
| R500-2 | T-111112 | 11 | 16 | ... | 49 |
| R500-3 | T-111113 | 03 | 14 | ... | 33 |
| | ... | ... | ... | | ... |
| R500-N | T-489756 | 03 | 11 | ... | 40 |

FIG. 5

600

| GAME IDENTIFIER: GM-DRAW-001 (602) | | | | | | |
|---|---|---|---|---|---|---|
| GAME INSTANCE IDENTIFIER: GM_D001_06/01/08_AND_06/03/08 (604) | | | | | | |
| ROUND 1 DRAWING RESULT(S): {03, 11, 16} (606) | | | | | | |
| ROUND N DRAWING RESULT(S): {19, 33, 40} (607) | | | | | | |
| TICKET / ENTRY IDENTIFIER 608 | AVAILABLE REDEMPTION VALUE 1 610 | REDEMPTION VALUE 1 CALIMED? 612 | AVAILABLE REDEMPTION VALUE N 614 | REDEMPTION VALUE N CLAIMED? 616 | REDEMPTION DATE/TIME 618 | REDEMPTION STATUS 620 |
| T-111111 | $500 | Y | N/A | N/A | 06/02/2008 13:04 | REDEEMED AFTER RD. 1 |
| T-111112 | $10 | N | $2 | Y | 06/03/2008 10:39 | REDEEMED AFTER FINAL RD. |
| T-111113 | FREE TICKET | N | $100 | Y | 06/07/2008 09:56 | REDEEMED AFTER FINAL RD. |
| T-489756 | $500 | N | $1,000,000 | Y | 06/05/08 14:26 | REDEEMED AFTER FINAL RD. |

FIG. 6

SYSTEMS, METHODS, AND APPARATUS FOR FACILITATING MULTI-ROUND LOTTERY PLAY

CROSS-REFERENCE TO RELATED APPLICATIONS

The present Application claims the benefit of the following U.S. Provisional Applications, the entirety of each of which is incorporated by reference herein:

U.S. Provisional Application No. 61/045,358, entitled "METHOD OF ADMINISTERING LOTTERY GAMES INCLUDING AN INTERMISSION FEATURE", filed Apr. 16, 2008, in the name of Walker et al.;

U.S. Provisional Application No. 61/087,386, entitled "SYSTEM AND METHOD FOR A MULTI-ROUND LOTTERY GAME WITH RECONFIGURABLE ENTRIES", filed Aug. 8, 2008, in the name of Walker et al.; and U.S. Provisional Application No. 61/045,854, entitled "SYSTEMS AND METHODS FOR RECONFIGURABLE LOTTERY TICKETS", filed Apr. 17, 2008, in the name of Walker et al.

BRIEF DESCRIPTION OF THE DRAWINGS

An understanding of embodiments described herein and many of the attendant advantages thereof may be readily obtained by reference to the following detailed description when considered with the accompanying drawings, wherein:

FIG. 4 is a diagram of a lottery games database according to some embodiments;

FIG. 5 is a diagram of a lottery entry database according to some embodiments;

FIG. 6 is a diagram of a redemption status database according to some embodiments;

DETAILED DESCRIPTION

A. Introduction

Figure 1:
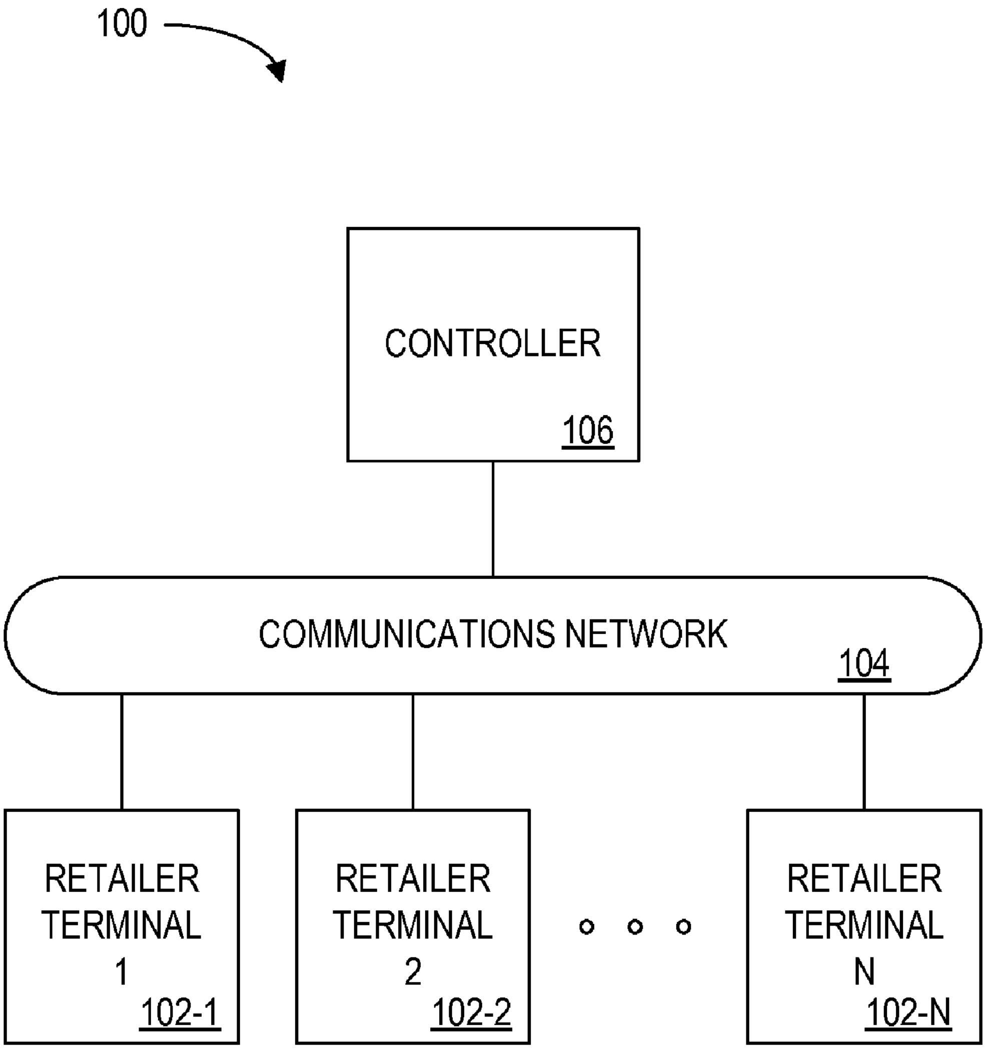
FIG. 1 is a block diagram of an embodiment of a lottery system according to some embodiments.

Applicants have recognized that some types of players of lottery games may desire to play a lottery game comprising multiple rounds. In one example, the necessary draw for a drawing-based lottery game (e.g., a "Pick 6" lottery game) may be more exciting where the necessary drawing of "winning" numbers is divided into two or more rounds of play. For example, a Pick-6 lottery may be divided into a first round in a first three numbers are drawn. The remaining three numbers to be drawn are drawn in a second, subsequent round of play. In one embodiment, between the rounds of play (e.g., during an "intermission" or reconfiguration period) a player may be allowed to revise one or more various aspects of his or her wagers in the multi-round lottery game. For instance, a player may be able to modify his lottery entry in the multi-round lottery game by, for example, changing one or more of her lottery numbers, increasing the value of the wager, or cancelling the wager/lottery entry altogether (e.g., in exchange for a settlement or redemption value payment).

B. Terms and Definitions

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting.

Some embodiments herein are associated with a "lottery entry". As used herein, the term "lottery entry" may refer to any entry into a lottery or other game of chance. As used herein, the phrases "lottery entry" and "entry into a game of chance", shall be synonymous.

Some embodiments herein are associated with a "lottery outcome". As used herein, the term "lottery outcome" may refer to any outcome resulting from a game of chance (e.g., lottery, sweepstakes, raffle, casino and/or other wagering game). A lottery outcome may involve choosing one or more winners by randomly selecting from a set of entries, and/or may be of the instant win type (e.g., Massachusetts State Lottery's Fabulous Fortune instant game ticket). A winning lottery outcome may also be associated with matching one or more indicia with a set of randomly generated indicia.

Some embodiments herein are associated with a "partial lottery outcome". As used herein, the term "partial lottery outcome" may refer to information about lottery outcome(s) of at least one, but not all, rounds or stages of a multi-round lottery game, as may be presented in or resulting from at least one round (e.g., a particular drawing round) of a multi-round lottery game. Partial lottery outcomes may be combined to determine a complete or final lottery outcome, and thus a winning status for an entry in a multi-round lottery game. For example, a partial lottery outcome may comprise two winning numbers in a pick six game, a portion of information about a lottery outcome revealed on an instant ticket, etc.

C. Systems

1. Lottery Communications Network

FIG. 1 illustrates a network environment 100 that includes a plurality of lottery retailer terminals 102-1 to 102-N, a communications network 104 and a controller 106. Generally, any or all of the retailer terminals 102-1 to 102-N may operate to: (i) receive information associated with one or more lottery entries including such data as: (a) ticket and/or lottery entry identifier(s), (b) entry indicia and (c) redemption values (base payout values and/or modified or enhanced payout values); (ii) transmit any or all of the received information to the controller 106 via the communications network 104; and (iii) output information including such data as: (d) information defining lottery entries and (e) information associated with one or more redemption values or benefits.

In general, each retailer terminal 102-1 to 102-N shown in FIG. 1 will correspond to (or be associated with) a particular lottery retailer. For example, retailer terminal 1 (102-1) of FIG. 1 may be associated with a first lottery retailer such as a convenience store, and retailer terminal 2 (102-2) of FIG. 1 may be associated with a second lottery retailer such as a supermarket. It should be understood that any number of lottery retailer terminals might be employed in a system 100, along with any number of corresponding controllers 106.

The controller 106 may operate to: (i) receive and store information associated with one or more lottery entries including such data as: (a) ticket/entry identifier(s) and (b) entry indicia; (ii) determine at least a first redemption value associated with a lottery entry for use when a player redeems his winning lottery entry prior to the end of the complete lottery game (e.g., a redemption or settlement value based on one or more partial lottery outcomes); (iii) receive a redemption request associated with the lottery entry; (iv) determine a time or round of play associated with the redemption request; (v) determine a second redemption value (e.g., based on a subsequent partial lottery outcome or full outcome); and (vi) transmit an indication of the appropriate redemption value to a lottery retailer terminal (e.g., for output or display to a lottery player and/or lottery terminal operator), as will be described below.

In some embodiments, a retailer terminal 102-1 of FIG. 1 may be configured to perform some or all of the functions of the controller 106. Thus, in some embodiments, the controller 106 and the lottery retailer terminal 102-1 (or another given retailer terminal and controller pairing) may be considered as the same "device".

Generally, as explained above, the communications network of FIG. 1 may comprise or include one or more local and/or wide-area network(s), proprietary and/or public network(s) (e.g., the Internet) for facilitating two-way data communications between the retailer terminals 102-1 to 102-N and the controller 106. The lottery controller may communicate with lottery retailer terminals directly or indirectly, via a wired or wireless medium such as the Internet, via a local area network (LAN), via a wide area network (WAN), via an Ethernet, via a Token Ring, a telephone line, a cable line, a radio channel, an optical communications line, a satellite communications link, or via any appropriate communications means or combination of communications means. Any number and type of devices may be in communication with the lottery controller, and communication between the lottery retailer terminals and the lottery controller 106 may be direct or indirect, such as over the Internet through a Web site maintained by computer on a remote server, or over an online data network including commercial online service providers, bulletin board systems and the like. In some embodiments, the devices may communicate with one another and/or the computer over RF, cable TV, satellite links and the like. A variety of communications protocols may be part of any such communications system, including but not limited to: Ethernet (or IEEE 802.3), SAP, ATP, Bluetooth™, and TCP/IP.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for days or weeks at a time. In some embodiments, a server computer may not be necessary and/or preferred. For example, in one or more embodiments, methods described herein may be practiced on a stand-alone gaming device and/or a gaming device in communication only with one or more other gaming devices. In such an embodiment, any functions described as performed by the computer or data described as stored on the computer may instead be performed by or stored on one or more gaming devices.

2. Lottery Retailer Terminal

Figure 2:
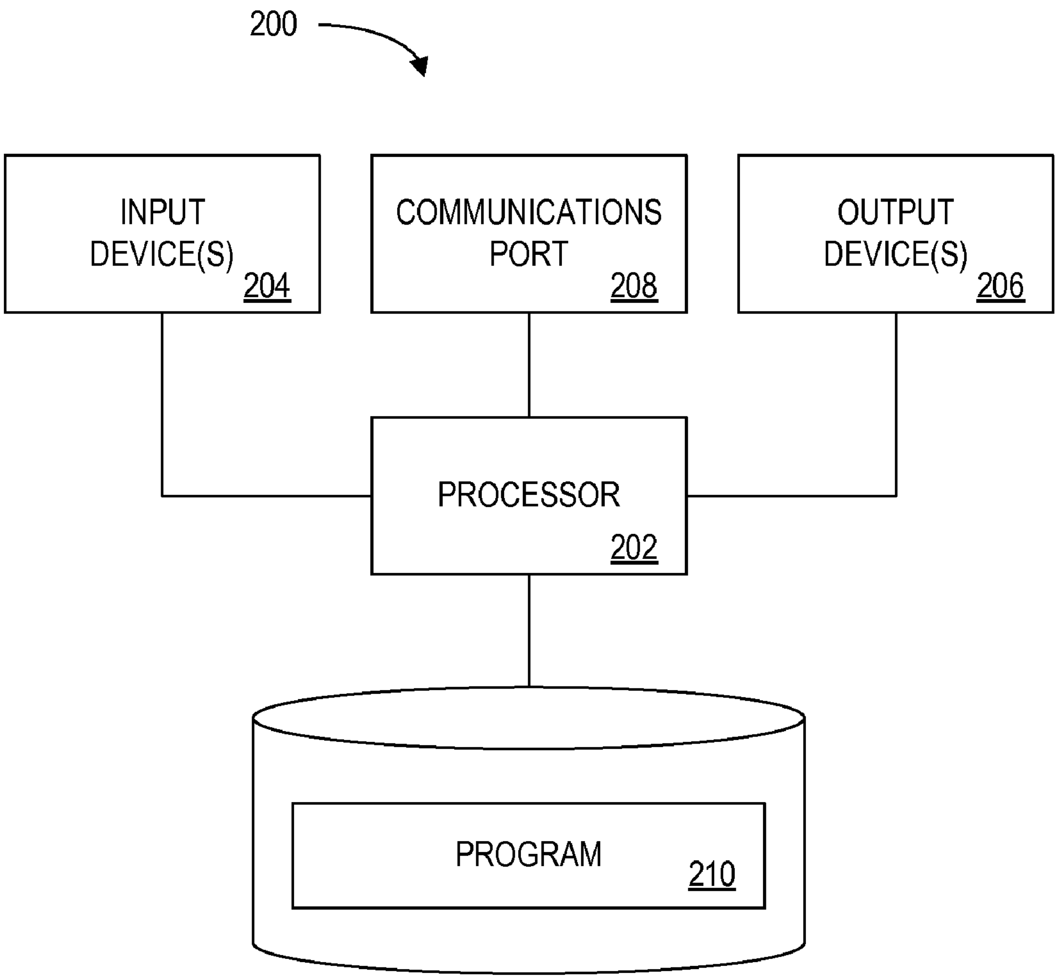
FIG. 2 is a block diagram of a lottery retailer terminal according to some embodiments.

FIG. 2 is a block diagram 200 of some exemplary components of a lottery retailer terminal. The lottery retailer terminal 200 may include one or more processor(s) 202 such as the PENTIUM® processor, manufactured by INTEL Corporation, or other processors manufactured by other companies, such as the AMD Athlon® processor manufactured by the Advance Micro Devices company. Generally, the processor is operative to perform or process instructions, and in particular, to operate in accordance with the various methods described herein. For example, the processor 202 may be operable to allow the lottery retailer terminal 200 to transmit data to (and receive data from) the controller 106 of FIG. 1. More specifically, the processor 202 may enable the transmission of data defining or identifying a lottery ticket or entry.

Accordingly, the lottery retailer terminal 200 may further include one or more input device(s) 204. The input devices may include components such as an optical scanner and/or a barcode scanner, for reading and/or for deriving information associated with a lottery entry. For example, a lottery ticket may include registration marks, authenticity data, various codes, micro-printed indicia, one or more sense marks, and/or other lottery indicia that must be read, for example, to distinguish between one or more lottery entries (which may all be contained on one lottery ticket, for example). Examples of additional input devices include, but are not limited to, a keypad, a mouse, an image capturing device (e.g., an optical character recognition (OCR) device), a biometric reader, a portable storage device (e.g., a memory stick), and the like.

According to some embodiments, the lottery retailer terminal input device(s) 204 may comprise or include a clock. The clock may be employed to detect, derive and/or append time and/or date information for use by the controller 106 to: (i) create a data record corresponding to lottery tickets or lottery entries purchased at the lottery retailer terminal 200, and/or (ii) to determine redemption time, round and/or date information associated with lottery tickets and/or lottery entries, and/or (iii) determine whether a lottery player has redeemed his ticket in a manner that qualifies him to receive a particular redemption or settlement value (for example, if the player makes a lottery ticket redemption request prior to the revealing of a full lottery outcome).

The lottery retailer terminal 200 of FIG. 2 may further include one or more output device(s) 206. Such output device(s) 206 may include such components as a display for outputting information to a lottery player or to a terminal operator (e.g., win/loss information and/or payout amounts), one or more benefit output devices (e.g., a cash drawer, a currency dispenser), a printer for producing a physical record (e.g., paper slip, receipt, ticket, voucher, coupon, etc.) that defines a lottery ticket or lottery entry, audio/video output device(s), and the like.

The lottery retailer terminal 200 may also include one or more communications port(s) 208, such as a serial port, modem or the like. Generally, the communications port 208 may be operable to facilitate two-way data communications between (i) the lottery retailer terminal 200 and (ii) the controller 106 shown in FIG. 1. In accordance with some embodiments, the communications port 208 may operate to facilitate the transmission of information between the lottery retailer terminal 200 and a player device such as a personal digital assistant (PDA), cell phone and/or a dedicated (e.g., a proprietary) device.

The lottery retailer terminal 200 may further include a data storage device 210 such as a hard disk, optical or magnetic media, random access memory (RAM) and/or read-only memory (ROM), or the like memory device. Generally, the lottery retailer terminal data storage device 210 stores a software program, the software program enabling the processor 202 of the retailer terminal 200 to perform various functions including some or all of the various steps described herein. For example, as noted above with respect to FIG. 1, in accordance with some embodiments, the retailer terminal 200 may be configured to perform some or all of the functions of the controller (and vice versa) such that the controller 106 and the lottery retailer terminal 200 (or, referring to FIG. 1, a given lottery terminal and controller pairing) may be considered as the same "device". An example retailer terminal available in the marketplace is the EXTREMA® clerk-operated lottery terminal, distributed by Scientific Games Corporation of Alpharetta, Ga.

In some embodiments, a lottery sales device may be utilized in place of a lottery retailer terminal 200. Such a lottery sales device may be implemented as a system controller, a dedicated hardware circuit, an appropriately programmed general-purpose computer, or any other equivalent electronic, mechanical or electro-mechanical device. Thus, in various embodiments, a lottery sales device may comprise, for example, a Video Lottery Terminal that may include a touch sensitive screen for use by a player, a personal computer (e.g., which communicates with a remote lottery server), a telephone, or a portable handheld device (e.g., a device similar to a personal digital assistant (PDA) or other analog or digital communications device). The lottery sales device may comprise any or all of the devices of the aforementioned systems. In some embodiments, a user device such as a PDA, cell phone, and/or portable gaming unit (e.g. the Playstation™ Portable (PSP), distributed by Sony Corporation) may be used in place of, or in addition to, some or all of the device components.

3. Lottery Operator Controller

Figure 3:
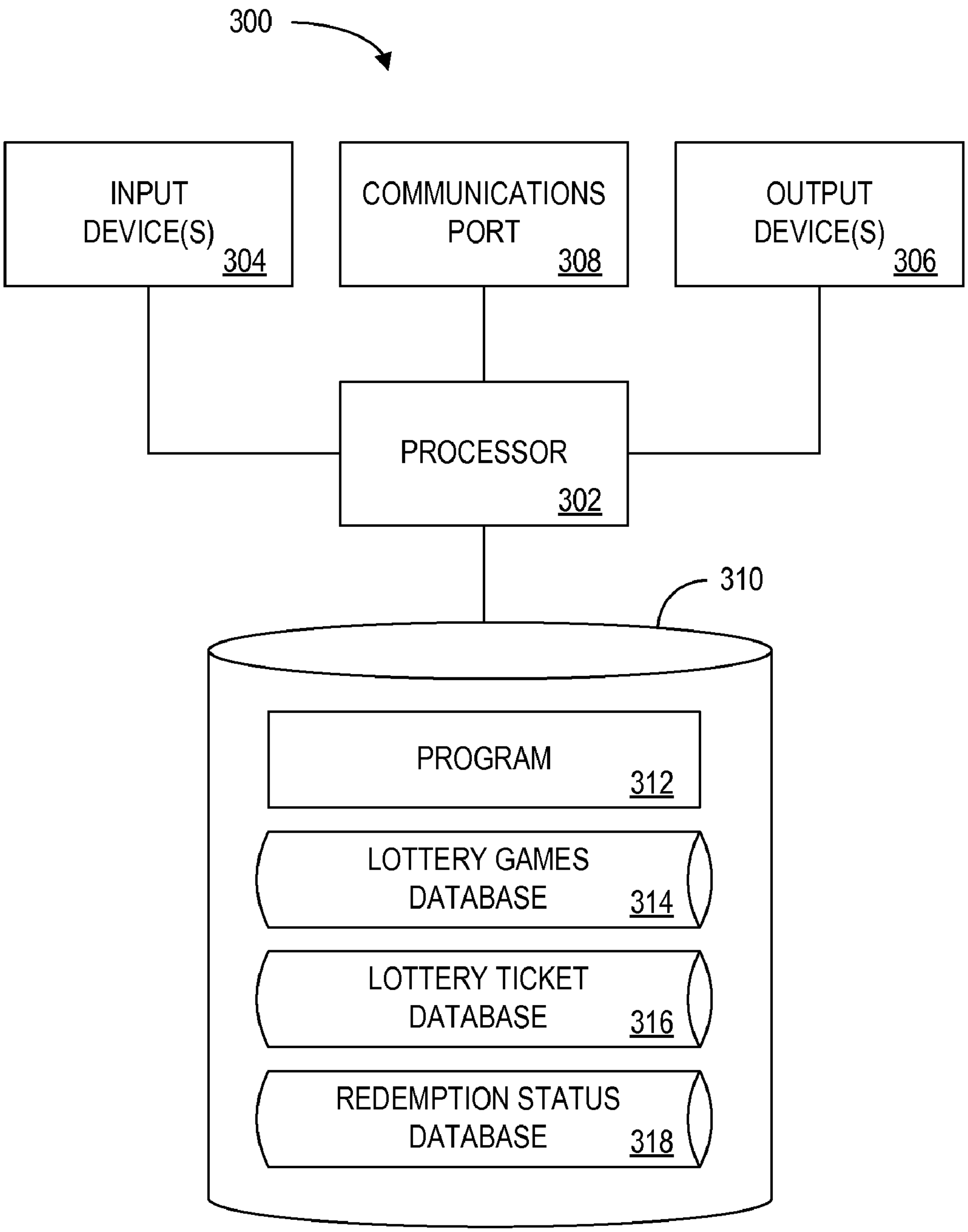
FIG. 3 is a block diagram of a lottery operator controller according to some embodiments.

FIG. 3 is a block diagram illustrating an embodiment of the components of a lottery operator controller 300. Similar to the lottery retailer terminal 200 of FIG. 2, the lottery operator controller 300 may include one or more processor(s) 302 such as the PENTIUM® processor manufactured by INTEL Corporation, or the AMD Athlon® processor manufactured by the Advance Micro Devices company. Such a processor 302 functions to process instructions, and in particular, to operate in accordance with various methods described herein. For example, the processor 302 may operate to allow the lottery operator controller 300 to transmit data to (and receive data from) the lottery retailer terminal 200 shown in FIG. 2. More specifically, the controller processor 302 may enable the transmission of data defining or identifying a lottery ticket or entry, as well as information defining one or more payout(s) associated with that lottery ticket to a specific one of the lottery retailer terminals 102-1 to 102-N shown in the lottery network 100 of FIG. 1. Thus, the lottery operator controller may be implemented as a system controller, a dedicated hardware circuit, an appropriately and particularly programmed general-purpose computer, or any other equivalent electronic, mechanical or electro-mechanical device capable of providing for one or more of the embodiments described herein. In various embodiments, a lottery operator controller may comprise, for example, a personal computer (e.g., which communicates with a remote lottery sales terminal) or mainframe computer.

The lottery operator controller 300 may further include one or more input device(s) 304. Examples of such input devices include a keypad, a mouse, a touch-screen, a random number generator, a microphone, and other digital or analog input devices. According to some embodiments, the lottery operator controller input device(s) 304 may comprise or include a clock. As described above, the clock may be employed to derive time and/or date information for use by the lottery controller 300.

The embodiment of the lottery operator controller 300 further includes one or more output device(s) 306. Example of output devices 306 include a monitor or other display for outputting information to a user of the lottery operator controller (e.g., for displaying information such as statistical or sales data, win and loss information and/or payout amounts), a printer for producing a physical record (e.g., a report, a paper slip, a voucher, a coupon, a ticket) of such data, and the like. In addition, the lottery operator controller 300 may include one or more communications ports 308, such as a serial port, modem or the like, operable to facilitate two-way data communications between (i) the operator controller 300 and (ii) one or more lottery retailer terminals 200, as described above with respect to FIGS. 1 and 2.

The lottery operator controller 300 may also include a data storage device 310 (e.g., a hard disk or hard drive, a media-based (removable) memory, or the like). In some embodiments, the lottery operator controller data storage device 310 stores at least one software program 312, which includes a program to enable the processor 302 to perform some or all of the various steps and functions of at least one implementation of the methods described in detail herein. In addition, the lottery operator controller data storage device 310 may operate to store (i) a lottery games database 314 (described below with respect to the database 400 shown in FIG. 4), (ii) a lottery entry database 316 (described below with respect to the database 500 shown in FIG. 5), and (iii) a redemption status database 318 (described below with respect to the database 600 shown in FIG. 6).

In some embodiments, the lottery operator controller may include a lottery ticket server device that is located at a lottery ticket printing facility, and may also function to manage the ticket printing process. The lottery operator controller may also function to develop the lottery game matrix (e.g., determining base payouts, enhanced payouts, win frequencies and the like) and to match static lottery content with secure paytable (or payout distribution) data. In some embodiments, a lottery ticket printer device for use in such lottery systems may utilize the game matrix information from the lottery server and may apply it to the secure paytable data.

4. Other Devices

In some embodiments, a kiosk (not shown) may be configured to execute or assist in the execution of various lottery game processes. In an implementation, a kiosk may comprise a processor and a storage device or memory as described above. A kiosk may also comprise various input devices (e.g., a keyboard, a mouse, buttons, an optical scanner for reading barcodes or other indicia, a CCD camera, and the like), output devices (e.g., a display screen, audio speakers), benefit output devices (e.g., a coin tray, a currency dispenser), communications ports, and the like. A kiosk may be configured to communicate with a lottery controller or lottery server. In some embodiments, kiosks may execute or assist in the execution of various lottery functions, as described herein.

In some embodiments, players may use one or more computing devices to obtain more information about the lottery games, and/or the specific lottery game that the player is playing. For example, a player may utilize a personal computer to access a website that contains lottery game hints, lottery game instructions, winning lottery entry payout information that includes base payout information and enhanced payout information, and the like.

5. Databases

FIG. 4 is a tabular representation of an embodiment of the lottery operator controller lottery games database 400. The lottery games database 400 stores data associated with one or more lottery games and/or lottery game formats. It should be understood that the various database examples described herein include illustrative accompanying data as shown in the drawings. Consequently, the data appearing in the databases is exemplary in nature, and such data entries are not limiting with regard to functionality or to the types of data that may be stored therein.

In the embodiment of FIG. 4, each record in the lottery games database generally defines a game available for play and/or for purchase of lottery entries by a lottery player. In particular, for each game defined by an entry in the lottery games database 400, a game identifier field 402 stores data that uniquely identifies the lottery game of the corresponding record. The data stored in the game identifier field 402 may comprise, for each available game, a unique numeric, alphanumeric or other type of code that uniquely identifies the lottery game defined by the corresponding entry.

For each lottery game identified by an entry in the game identifier field 402, one or more associated game rules field(s) 406 may store data or information, including a textual description of the criteria required of a lottery entry to be successful (i.e., to win a prize) in the corresponding lottery game. For example, referring to row R400-1, the game identified as "GM-DRAW-001" in the game identifier field 402 corresponds to lottery game rules based on a standard "Pick 6" on-line lottery game, wherein a player selects six numbers and winning lottery entries match at least 3 of 6 drawn numbers. The lottery games database 400 also includes a Payout Criteria 1 field 408, Payout 1 field 410, Payout Criteria N field 412 and a Payout N field 414. For any particular "Pick-6" lottery game, more or less payout criteria and payout fields would be included, which will be explained in more detail below.

For example, the Connecticut Lottery Corporation provides a "Pick-6" on-line lottery game called "Classic Lotto" wherein players go to a lottery retailer and fill out a "Classic Lotto Play Slip" by choosing six different numbers from the ordinal range of 1 to 44 (inclusive) in each individual play section or board (alternately, a computer can randomly pick the numbers for the player, if the player so chooses). Players of "Classic Lotto" can play up to five boards on each selection slip, and pay one-dollar per entry. For example, a lottery player can pay a clerk at a lottery retailer five dollars to purchase five lottery entries, wherein each lottery entry includes six numbers selected from the 44 available choices. Thus, the player may fill in a pay slip and hand it to the clerk, who then enters the pay slip into the retailer terminal. The lottery terminal then issues a printed "Classic Lotto" ticket for the player to take home. The player keeps the ticket until the drawing for that lottery game, and then compares the number of his lottery entries to the drawn numbers to determine if he has won any prize(s).

Turning again to FIG. 4, row R400-1 illustrates a Pick-6 lottery game identified as "GM-DRAW-001", and the payout criteria field 408 indicates that if the player matches 3 out of 6 drawn numbers, then a payout of three (3) dollars is made (see Payout Field 410). Larger payouts would also be determined for matching 4 out of 6 and for matching 5 out of 6 numbers as well (which payout criteria is not shown). The Payout Criteria N field 412 indicates that a win of 6 out of 6 matches pays out the top prize, and the top prize is yet to be determined as shown in Payout N field 414 (because the top prize is typically calculated by the lottery authority as a percentage of the total amount of money spent by players to purchase tickets, and the calculation may also include other variables that would serve to either increase or decrease the top prize value).

FIG. 4 also illustrates that, for each game corresponding to an entry in the game identifier field 402, one or more payout criteria fields (408 and 412) and a corresponding payout field (410 and 414) store data specifying the actual criteria and corresponding payouts for lottery entries that satisfy such criteria. For example, using the "Pick-6" example above, typical payout criteria and corresponding payouts may comprise:

| Criteria | Payout |
|---|---|
| Match 0/6 | 0 |
| Match 1/6 | 0 |
| Match 2/6 | 0 |
| Match 3/6 | $3 |
| Match 4/6 | $50 |
| Match 5/6 | $2,000 |
| Match 6/6 | Win Jackpot/Top Prize |

FIG. 4 also includes data for other lottery games. In particular, row R400-2 for lottery game GM-DRAW-002 is a "Pick-3" type of game, and the data includes a game rule 406 wherein a player must match the three drawn numbers in exact order. The payout criteria one 408 for matching one number out of the three drawn in the correct order corresponds to a payout value of three-dollars as shown in the Payout 1 field 410. In addition, a payout criteria for matching two out of three numbers (not shown) is stored, and payout criteria N (which is the third criteria in this example) recites that if the player matches all three numbers in order, then that lottery entry corresponds to a high-level base payout 414 of five hundred dollars.

Referring to row R400-3, the lottery game GM-DRAW-003 corresponds to a "Pick-4" type of game, and includes a game rule 406 wherein a player may match up to four drawn numbers in any order. The Payout Criteria 1 in field 408 for matching two numbers out of the four drawn corresponds to a payout value of five-dollars as shown in Payout 1 field 410. In addition, Payout Criteria N (which is the fourth criteria for this example) recites that if the player matches all four numbers (in exact order) then a high-level payout 414 of five thousand dollars is made. As explained earlier, the database 400 also includes entries for matching three out of the four numbers (with associated payout amounts) as well.

Row R400-(N−1) corresponds to lottery game GM-DRAW-N, which is a "Pick-10" type of game that includes a game rule 406 specifying that a player may select up to 10 numbers from a field or board of 80 numbers. If a player only picks one spot (i.e., only picks one number) as specified in the Payout 1 field 408, and that spot matches a drawn number then the player wins a two-dollar prize as shown in the Payout 1 field 410. However, if the player picks ten spots and all ten match the drawn numbers as specified in Payout Criteria N field 412, then as shown in Payout N field 414 he is entitled to a high-level, one-hundred thousand dollar prize. As explained above, database entries would also exist to include all intermediate winning combinations, for example, payout amounts for obtaining three out of three matches numbers, four out of four matches, four out of five matches, five out of five matches (and possibly prizes for matching most numbers of a group, such as obtaining five out of six matches, six out of seven matches, and the like), and any other matching sets or match permutations as desired.

Lastly, row R400-N illustrates data for lottery game GM-INSTANT-N, which corresponds to an instant lottery game. This lottery game includes a game rule 406 specifying that a player scratches off the play area to reveal symbols, and if any three of such symbols match, then the prize payout corresponds to the symbols that match. In this case, the game rules are equivalent to the payout criteria. For example, if the player scratches off three matching symbols that each indicate "Two Dollars", then a prize payout of two-dollars is awarded as indicated in the Payout 1 field 410. If the player matches three symbols that each indicates "$1,000.00", then as shown in Payout N field 414 the player is entitled to that high-level amount as a prize.

FIG. 5 depicts a tabular representation of an embodiment of a lottery entry database 500 corresponding to an on-line lottery game. In general, lottery entry databases such as that shown in FIG. 5 store data associated with eligible lottery tickets and/or lottery entries for a given instance of a lottery game and/or lottery drawing (e.g., of a multi-round lottery game). Such lottery entry databases may be similar to the lottery game database 400 shown in FIG. 4.

Referring to FIG. 5, the lottery entry database 500 includes a game identifier field 502 for storing data identifying the particular lottery game (or type of game) associated with lottery entries (as defined by other records in the table of FIG. 5). The lottery entry database 500 may also include a game instance identifier field 504 for storing data identifying a particular instance (e.g., a drawing round or rounds) associated with the particular lottery game. For example, the information stored in the game instance identifier field 504 may include the time and/or the date information identifying the particular instance (for example, the drawing time and date of winning numbers) or instances (for example, multiple drawing times and dates for rounds of drawing winning numbers) of the lottery game.

Each lottery entry that is eligible for the lottery game identified in field 502 is associated with an expiration date field 506 that stores data indicative of the last available date by which winning entries associated with that lottery game instance may be redeemed for any redemption value. This is the expiration date of the lottery game. For each lottery entry that is eligible for the identified game and game instance (e.g., an instance of a drawing for which the entry may be eligible), a lottery entry identifier field 508 stores data identifying the eligible ticket(s) or entries. The information stored in the lottery entry identifier field 508 may be any unique numeric, alphanumeric or other type of code that uniquely identifies an eligible lottery entry for the particular lottery game instance identified by the information stored in the game instance identifier field 504. In association with the identifier that uniquely identifies a given eligible lottery entry, ticket entry/indicia fields 510, 512 to 514 store data representing the particular numbers (or other indicia) comprising the actual lottery entry (e.g., in accordance with an on-line game embodiment) of the corresponding record. As shown, there are N such fields (where N may be equal to the total amount of numbers to be drawn for that particular lottery). For example, the New York State lottery agency operates a daily on-line lottery game called "Pick 10", wherein players select 10 numbers from the ordinal range of 1 through 80 (inclusive) by filling in squares on a playcard. The player then receives one or more lottery ticket(s) (or entries) for use in comparing their chosen numbers to numbers determined via a random drawing (i.e., "winning numbers"). If the database 500 corresponded to such a "Pick 10" game, then row R500-1 for ticket T-11111 would include ten fields (one for each number chosen by the player), such that ticket/entry indicia 1 in field 510 is 14, ticket/entry indicia 2 in field 512 is 23, out to the tenth chosen number (shown in ticket/entry indicia N field 514) of 28. Similar data is shown for rows R500-2, R500-3 and R500-N in FIG. 5. The information stored in these lottery ticket or lottery entry indicia fields will be compared by the operator controller to a given set of winning indicia (e.g., determined in conjunction with a lottery drawing/round of a multi-round game) in order to determine the number of matches, win or loss status and associated payouts (if any) for each of the eligible lottery entries within a given game instance (e.g., an instance of a drawing) or full lottery game, as described above with respect to FIG. 4.

In addition (though not shown) the ticket database of FIG. 5 may include one or more field(s) operative to store other types of data identifying the particular retailer from which the lottery entry was purchased, and/or data identifying the time and date of the lottery entry purchase.

FIG. 6 is a tabular representation of an embodiment of a redemption status database 600 that may be utilized by a lottery operator controller in facilitating play of a multi-round lottery game. In general, the redemption status database 600 stores information that may be used by the lottery operator controller to determine the redemption value of a lottery ticket (e.g., at any of various points during play of the multi-round game). The database 600 includes a game identifier field 602 and a game instance identifier field 604 (both of which have been described above with respect to FIGS. 4 and 5). Round results fields 606 and 607 are also included for storing information identifying a set of winning or drawn indicia, in this case the winning lottery numbers that were drawn in a particular round of a multi-round game (according to an on-line game embodiment). In the illustrated example, the round results field 606 indicates that the results of a Round 1 drawing of a lottery game associated with the game GM-DRAW-001 were the numbers 03, 11 and 16. The game results field 607 indicates that the results of a Round 2 drawing were the numbers 19, 33 and 40. Thus, these numbers are the complete set of winning numbers for this particular game instance (for other lottery games, a set of symbols rather than numbers may be drawn). Based on the information stored in the game results fields 606 and 607 and the information in the corresponding entries of the ticket database 500 (see FIG. 5), at least a first redemption value or first payout is determined for the winning lottery entries identified in the ticket/entry identifier field 608 of the corresponding record. For example, the first redemption values and/or payouts may be determined in a manner similar to that discussed above with respect to various payout criteria (and/or game rules) represented in the lottery games database of FIG. 4. In some embodiments, the redemption value (e.g., following a partial lottery outcome) may be based on an expected value of the full lottery outcome for the lottery entry (e.g., based on the number of matches in a given round). Upon determination of the first redemption value/payout, information representing this amount is then stored in the "Available Redemption Value 1" field 610 of the redemption status database 600. According to some embodiments, a player may be offered and/or may request to "settle" or redeem a lottery entry before the full lottery outcome has been determined for a multi-round lottery game. For example, a player may request to redeem a lottery entry after the results of a lottery round are revealed and the player determines a number of numbers matched so far, and the corresponding redemption value being offered in exchange for cancelling the lottery (e.g., rendering it ineligible for subsequent rounds and/or the redemption value associated with the final lottery outcome).

For each lottery ticket or lottery entry defined by an entry in the ticket status database 600, a redemption value 1 claimed field 612 may store information representing whether or not an available payout associated with the given entry has been issued, claimed or awarded.

Upon the issuance (or authorization of issuance) of a payout for a given entry and the determination of the actual payout to be provided, information reflecting the payout may be stored in the redemption date/time field 618 and/or redemption status field 620.

For each lottery ticket or lottery entry defined by an entry in the ticket status database 600, an available redemption value n field 614 and redemption value n claimed field 616 may store information, similar to that discussed above with respect to the available redemption value 1 field 610 and redemption value 1 claimed field 612, representing the appropriate information with respect to a round n of play in a multi-round lottery game.

D. Processes

According to one embodiment, a player may buy a lottery ticket (e.g., at a convenience store, through an online lottery website, or via a mobile device such a cell phone) for a multi-round lottery game. A round of the lottery game may comprise one or more numbers being drawn. For example, a "Pick 6" lottery may be divided into two rounds in at least the following ways:

- a first round in which 1 number is drawn, and a second round in which 5 numbers are drawn
- a first round in which 2 numbers are drawn, and a second round in which 4 numbers are drawn
- a first round in which 3 numbers are drawn, and a second round in which 3 numbers are drawn
- a first round in which 4 numbers are drawn, and a second round in which 2 numbers are drawn
- a first round in which 5 numbers are drawn, and a second round in which 1 number is drawn In some embodiments, during a pause or intermission between rounds of a multi-round game, a player may make changes to his ticket by, for example, logging on through a website or sending a text message from his cell phone.

According to some embodiments, a player may revise his lottery entry or bet in a lottery game in one or more of various ways, including, but not limited to:

- increasing the wager/bet value
- decreasing the wager/bet value
- changing one or more numbers that he is betting on
- buying one or more additional tickets (e.g., to "hedge" against a final number being 14 or 15)
- cancelling his wager/bet/entry and receiving a payment based on the current expected value of his bet (e.g., "settling" his bet)

In one embodiment, a player may revise his bet or lottery entry in multiple ways (e.g., changing a number and increasing his bet value).

In one embodiment, a player's lottery ticket may be identified by a number or code. The player may identify the lottery ticket or lottery entry by typing the identifier into a website form (e.g., typing 123457), sending a text message to a lottery controller (e.g., "settle ticket 123748"; "push ticket 123748 with $5 more"; "change ticket 123748 pick #5 to be 17").

In one embodiment, a lottery controller may provide for subdividing a particular drawn number into multiple partial outcomes, such as by limiting a first revealing of information to describe a characteristic of the number without revealing the number itself (e.g., "It's an even number" or "It's greater than 10").

Figure 7:
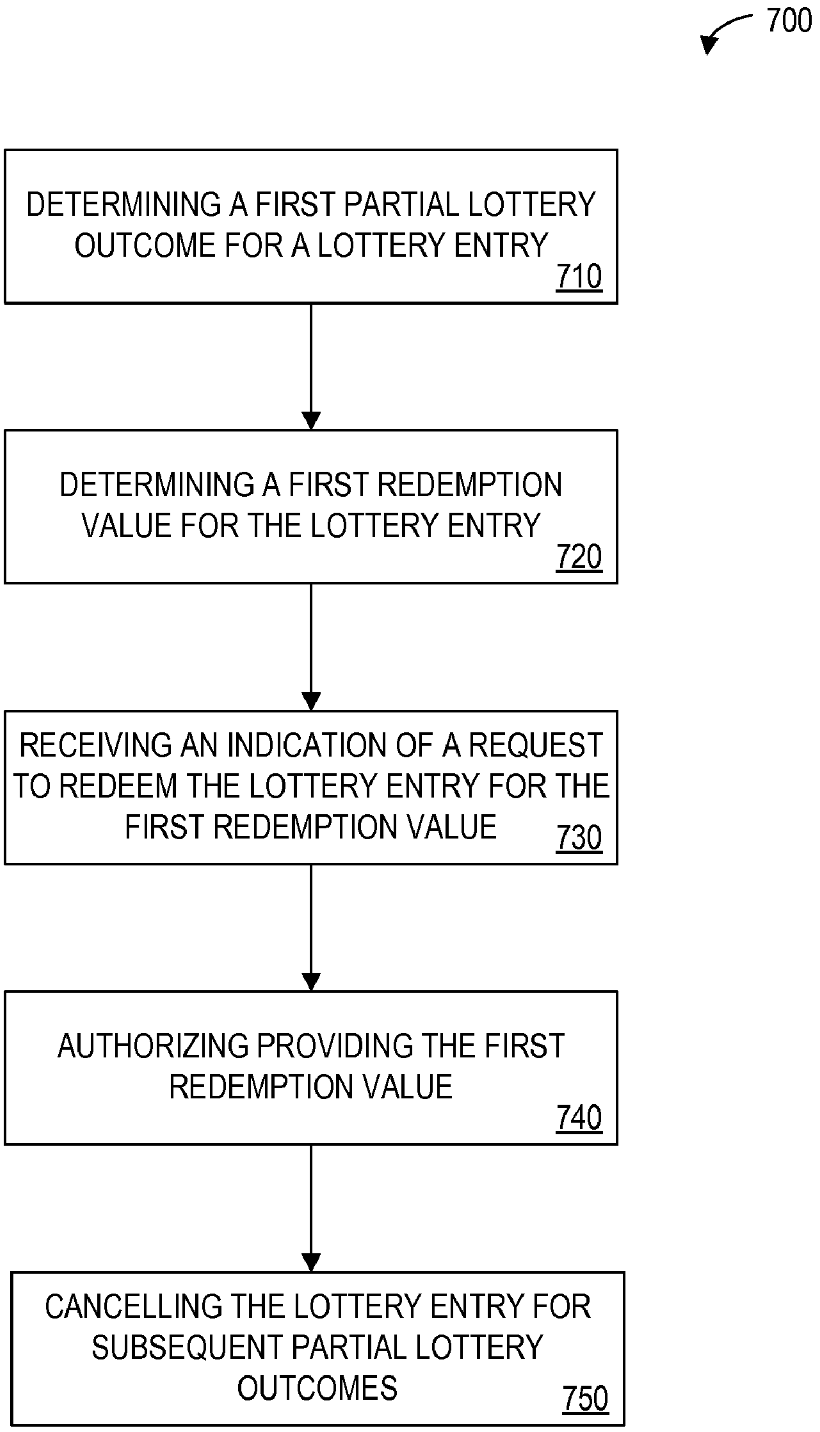
FIG. 7 is a flowchart of a method according to some embodiments.

Referring now to FIG. 7, a flow diagram of a method 700 according to some embodiments is shown. In some embodiments, the method 700 may be performed and/or implemented by and/or otherwise associated with the system 100 described in conjunction with FIG. 1. The methods, procedures, and/or processes described herein may generally be performed by the system 100 of FIG. 1 and/or any of the many components and/or devices (and/or combinations thereof) described herein. Other configurations of systems and devices may also or alternatively be utilized to perform the methods described herein without deviating from the scope of some embodiments. The procedures described herein do not necessarily imply a fixed order to the actions, and embodiments may be performed in any order that is practicable. Accordingly, it should be understood that, although the method illustrated by FIG. 7 is described as a series of numeric steps, the numeric designations are not intended to impart or imply a specific order to the steps. Rather, the steps of the method may be performed in any order that is practicable and may include the addition and/or omission of one or more particular steps. Note that any of the methods described herein may be performed by hardware, software (including microcode), firmware, or any combination thereof. For example, a storage medium may store thereon instructions that when executed by a machine result in performance according to any one or more of the embodiments described herein.

FIG. 7 is a flowchart of a process 700 according to an embodiment. Step 710 provides for determining a first partial lottery outcome corresponding to a lottery entry in a multi-round lottery game. Step 720 provides for determining a first redemption value for the lottery entry based on the first partial lottery outcome. Step 730 provides for receiving an indication of a request of a player (e.g., via a website, lottery terminal or text message) to redeem the lottery entry for the first redemption value in exchange for cancelation of the lottery entry with respect to subsequent partial lottery outcomes. In one embodiment, this request may be received prior to revealing a second partial outcome for the multi-round lottery game after revealing the first partial lottery outcome. Step 740 provides for authorizing (e.g., by the lottery controller transmitting an authorization signal to a lottery terminal) the providing of the first redemption value to the player. Step 750 provides for cancelling the lottery entry with respect to subsequent partial lottery outcomes (e.g., by deleting a database record for the lottery entry or updating the record to indicate the redemption value has been claimed).

According to some embodiments, receiving the indication of the request comprises receiving the indication of the request via a website, via a mobile phone, via a test message, and/or via a lottery terminal (e.g., of a retailer).

According to some embodiments, the multi-round lottery game comprises at least two rounds, each round corresponding to a respective drawing of at least one lottery number. In some embodiments, the lottery entry comprises a first lottery number corresponding to a first round of the multi-round lottery game and a second lottery number corresponding to a second round of the multi-round lottery game. In one embodiment, the determining the first partial lottery outcome comprises drawing at least one lottery number in a lottery drawing and comparing the at least one drawn number to the first lottery number (e.g., determining a match). In one embodiment, determining the first partial lottery outcome does not comprise comparing the at least one drawn number in the lottery drawing to the second lottery number (e.g., where particular numbers are assigned/designated for only particular rounds or drawings).

Some embodiments provide for determining a second partial lottery outcome of the multi-round lottery game and determining a second redemption value for the lottery entry based on the second partial lottery outcome, as illustrated in redemption status database 600 in FIG. 6. In one embodiment, the first redemption value may or may not be greater than the second redemption value. One embodiment provides for determining a full lottery outcome for the multi-round lottery game based on the first partial lottery outcome and at least one second partial lottery outcome and determining a final redemption value for the lottery entry based on the full lottery outcome. In one embodiment, a redemption value may be based on an expected value of a full outcome corresponding to a lottery entry for the multi-round lottery game.

The method of claim 1, wherein the first redemption value is based on the first partial lottery outcome and at least one partial lottery outcome occurring prior to the first partial lottery outcome.

In one embodiment, a multi-round lottery game comprises a plurality of partial lottery outcomes, such as one or more lottery drawings and/or instant lottery games or outcomes.

Some embodiments provide for, after revealing the first partial outcome to the player, offering to the player an option to redeem the lottery entry for the first redemption value. Some embodiments provide for allowing the player to modify the lottery entry during an intermission in the multi-round game, or allowing the player to modify the lottery entry between rounds of the multi-round lottery game.

Some examples of modifications include: changing a value of a wager corresponding to the lottery entry, changing the numbers associated with one or more rounds, and/or purchasing at least one additional lottery entry eligible for rounds remaining in the multi-round lottery game. Appropriate modifications may be made to an appropriate record for a lottery entry, such as may be included in a lottery entry database.

Some embodiments of the present invention provide for determining a partial lottery outcome corresponding to a lottery entry in a multi-round lottery game; revealing to the player the partial lottery outcome; after revealing the partial lottery outcome to the player and prior to revealing a second lottery outcome for the multi-round game, allowing, by the lottery controller, the player to request to cancel the lottery entry and receive a first redemption value; determining, by the lottery controller, that no request of the player to cancel the lottery entry and receive the first redemption value was received after revealing the partial lottery outcome to the player and prior to revealing a second lottery outcome for the multi-round lottery game; and revealing the second lottery outcome for the multi-round lottery game.

Some embodiments may provide further for determining the first redemption value for the lottery entry based on the partial lottery outcome and/or determining, by the lottery controller, the first redemption value for the lottery entry based on an expected value of the second lottery outcome.

Some embodiments may provide for wherein the second lottery outcome is a second partial lottery outcome of the multi-round lottery game. In one embodiment, a second redemption value for the lottery entry is determined based on the partial lottery outcome and the second partial lottery outcome.

In one embodiment, the second lottery outcome is a final lottery outcome of the multi-round lottery game. In one embodiment, a second redemption value is determined for the lottery entry based on the final lottery outcome.

One embodiment provides for determining the final lottery outcome based on the partial lottery outcome and a second partial lottery outcome of the multi-round lottery game.

One embodiment provides for receiving an indication of a request of the player to redeem the lottery entry for a second redemption value that is based on the second lottery outcome.

One embodiment provides for receiving an indication of a request of the player to cancel a lottery entry with respect to any subsequent lottery outcomes in exchange for a second redemption value that is based on the second lottery outcome.

E. Examples

In one example implementation in accordance with some embodiments described herein, a state lottery is running a multi-round "Pick 6" game wherein players try to match six chosen numbers, individually selected from 1-36, with six numbers generated by the state lottery—three numbers in one drawing and three in another separate drawing. To play the game, players pay for a lottery entry and associate 6 desired numbers with the entry. Then three numbers are drawn (a partial lottery outcome) on a specified date and time (e.g., the numbers 22, 16 and 10). Players are then allowed to make one or more changes to their lottery entry, such as to redeem their lottery entries for a settlement value prior to completing the next round of play, or have one or more numbers on their ticket regenerated. For example, players with no matches after this drawing may choose to have six new numbers generated in hopes of matching one or more with those already selected. After a predetermined amount of time, the state lottery draws a second three numbers (a second partial lottery outcome). Players matching four or more numbers may be eligible for prizes as governed by the game's rules.

Rules of Interpretation

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this disclosure) nor the Abstract (set forth at the end of this disclosure) is to be taken as limiting in any way as the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as Standard Definition Television (SDTV), Enhanced Definition TV (EDTV), High Definition TV (HDTV), or the like. The information may likewise be static, in which case, painted glass may be used to form the display. Note that static information may be presented on a display capable of displaying dynamic information if desired. Some displays may be interactive and may include touch screen features or associated keypads as is well understood.

The present disclosure frequently refers to a "control system". A control system, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, SAS™ by IGT, OASIS™ by Aristocrat Technologies, SDS by Bally Gaming and Systems, ATP, TCP/IP, GDS published by the Gaming Standards Association of Fremont Calif., the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. A method comprising:

determining, by a lottery controller, a first partial lottery outcome corresponding to a lottery entry in a multi-round lottery game, wherein the lottery entry comprises a first lottery number corresponding to a first round of the multi-round lottery game and a second lottery number corresponding to a second round of the multi-round lottery game, wherein determining the first partial lottery outcome comprises drawing at least one lottery number in a lottery drawing and comparing the at least one drawn number to the first lottery number, wherein determining the first partial lottery outcome does not comprise comparing the at least one drawn number in the lottery drawing to the second lottery number;

determining, by the lottery controller, a first redemption value for the lottery entry based on the first partial lottery outcome;

prior to revealing a second partial outcome for the multi-round lottery game after revealing the first partial lottery outcome, receiving, by the lottery controller, an indication of a request of a player to redeem the lottery entry for the first redemption value in exchange for cancelation of the lottery entry with respect to subsequent partial lottery outcomes;

authorizing, by the lottery controller, providing the first redemption value to the player; and cancelling, by the lottery controller, the lottery entry with respect to subsequent partial lottery outcomes.

2. A method comprising:

determining, by a lottery controller, a first partial lottery outcome corresponding to a lottery entry in a multi-round lottery game, wherein the lottery entry comprises a first lottery number corresponding to a first round of the multi-round lottery game and a second lottery number corresponding to a second round of the multi-round lottery game, wherein the first lottery number corresponds to the first round but not the second round of the multi-round lottery game, determining, by the lottery controller, a first redemption value for the lottery entry based on the first partial lottery outcome;

prior to revealing a second partial outcome for the multi-round lottery game after revealing the first partial lottery outcome, receiving, by the lottery controller, an indication of a request of a player to redeem the lottery entry for the first redemption value in exchange for cancelation of the lottery entry with respect to subsequent partial lottery outcomes;

authorizing, by the lottery controller, providing the first redemption value to the player; and cancelling, by the lottery controller, the lottery entry with respect to subsequent partial lottery outcomes.

3. An apparatus comprising:

a processor in communication with at least one lottery terminal; and a storage device in communication with the processor and storing instructions that when executed by the processor result in:

determining a first partial lottery outcome corresponding to a lottery entry in a multi-round lottery game, wherein the lottery entry comprises a first lottery number corresponding to a first round of the multi-round lottery game and a second lottery number corresponding to a second round of the multi-round lottery game, wherein determining the first partial lottery outcome comprises drawing at least one lottery number in a lottery drawing and comparing the at least one drawn number to the first lottery number, wherein determining the first partial lottery outcome does not comprise comparing the at least one drawn number in the lottery drawing to the second lottery number;

determining a first redemption value for the lottery entry based on the first partial lottery outcome;

prior to revealing a second partial outcome for the multi-round lottery game after revealing the first partial lottery outcome, receiving, via a lottery terminal, an indication of a request of a player to redeem the lottery entry for the first redemption value in exchange for cancelation of the lottery entry with respect to subsequent partial lottery outcomes;

authorizing providing the first redemption value to the player; and cancelling the lottery entry with respect to subsequent partial lottery outcomes.

4. A computer-readable memory device storing instructions that when executed by a processor result in:

determining a first partial lottery outcome corresponding to a lottery entry in a multi-round lottery game, wherein the lottery entry comprises a first lottery number corresponding to a first round of the multi-round lottery game and a second lottery number corresponding to a second round of the multi-round lottery game, wherein determining the first partial lottery outcome comprises drawing at least one lottery number in a lottery drawing and comparing the at least one drawn number to the first lottery number, wherein determining the first partial lottery outcome does not comprise comparing the at least one drawn number in the lottery drawing to the second lottery number;

determining, by a lottery controller, a first redemption value for the lottery entry based on the first partial lottery outcome;

prior to revealing a second partial outcome for the multi-round lottery game after revealing the first partial lottery outcome, receiving, by the lottery controller, an indication of a request of a player to redeem the lottery entry for the first redemption value in exchange for cancelation of the lottery entry with respect to subsequent partial lottery outcomes;

authorizing, by the lottery controller, providing the first redemption value to the player; and cancelling, by the lottery controller, the lottery entry with respect to subsequent partial lottery outcomes.

5. The method of claim 1, wherein the multi-round lottery game comprises at least two rounds, each round corresponding to a respective drawing of at least one lottery number.

6. The method of claim 1, further comprising:

determining, by the lottery controller, a second partial lottery outcome of the multi-round lottery game; and determining, by the lottery controller, a second redemption value for the lottery entry based on the first partial lottery outcome and the second partial lottery outcome.

7. The method of claim 1, further comprising:

determining, by the lottery controller, a full lottery outcome for the multi-round lottery game based on the first partial lottery outcome and at least one second partial lottery outcome; and determining, by the lottery controller, a final redemption value for the lottery entry based on the full lottery outcome.

8. The method of claim 1, wherein the first redemption value is based on an expected value of a full outcome corresponding to the lottery entry for the multi-round lottery game.

9. The method of claim 1, wherein the first redemption value is based on the first partial lottery outcome and at least one partial lottery outcome occurring prior to the first partial lottery outcome.

10. The method of claim 1, wherein the multi-round lottery game comprises a plurality of partial lottery outcomes.

11. The method of claim 1, wherein the partial lottery outcome comprises a lottery drawing.

12. The method of claim 1, wherein the partial lottery outcome comprises an instant lottery outcome.

13. The method of claim 1, further comprising:

revealing the first partial outcome to the player.

14. The method of claim 1, wherein authorizing providing the first redemption value to the player is via a lottery terminal.

15. The method of claim 1, wherein cancelling the lottery entry comprises updating a record of database, the record corresponding to the lottery entry.

16. The method of claim 1, wherein receiving the indication of the request comprises receiving the indication via at least one:

a website, a mobile phone, a text message, and a lottery terminal.

17. The method of claim 6, wherein the first redemption value is greater than the second redemption value.

18. The method of claim 6, wherein the first redemption value is not greater than the second redemption value.

19. The method of claim 13, further comprising:

after revealing the first partial outcome to the player, offering to the player an option to redeem the lottery entry for the first redemption value.

* * * * *